United States Patent
Jacoby et al.

(10) Patent No.: US 10,803,891 B1
(45) Date of Patent: Oct. 13, 2020

(54) VERTICALLY TRANSLATING LOAD/UNLOAD RAMP MECHANISM FOR COLD STORAGE DATA STORAGE DEVICE

(71) Applicant: Western Digital Technologies, Inc., San Jose, CA (US)

(72) Inventors: Jon Jacoby, San Jose, CA (US); David Myers, Campbell, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/516,211

(22) Filed: Jul. 18, 2019

(51) Int. Cl.
  G11B 5/48 (2006.01)
  G11B 5/54 (2006.01)
  G11B 5/53 (2006.01)

(52) U.S. Cl.
  CPC ............ *G11B 5/4833* (2013.01); *G11B 5/531* (2013.01); *G11B 5/54* (2013.01)

(58) Field of Classification Search
  CPC ...... G11B 5/4833; G11B 5/483; G11B 5/4853
  USPC ............................................... 360/254–254.7
  See application file for complete search history.

(56) References Cited

U.S. PATENT DOCUMENTS

| | | | |
|---|---|---|---|
| 3,134,097 A | 5/1964 | Stevens et al. | |
| 3,172,082 A | 3/1965 | Dirks | |
| 3,311,902 A | 3/1967 | Appleton | |
| 3,505,060 A | 3/1970 | Goddard et al. | |
| 3,940,794 A | 2/1976 | Griffiths et al. | |
| 4,164,767 A | 8/1979 | Gyi et al. | |
| 4,208,685 A | 6/1980 | Matla et al. | |
| 4,566,087 A | 1/1986 | Kraft | |
| 4,742,410 A | 5/1988 | Smith | |
| 4,839,758 A | 6/1989 | Honjoh | |
| 4,884,261 A | 11/1989 | Dalziel | |
| 5,023,737 A | 6/1991 | Yaeger | |
| 5,283,705 A | 2/1994 | Iwabuchi | |
| 5,307,224 A | 4/1994 | Minase | |
| 5,347,414 A | 9/1994 | Kano | |
| 5,467,238 A * | 11/1995 | Lee .......................... | G11B 5/41 360/128 |
| 5,550,695 A | 8/1996 | Matsumoto | |

(Continued)

OTHER PUBLICATIONS

International Business Machines Corporation, IBM Customer Engineering Manual of Instruction, RAMAC 305, copyright 1958, 1959 by International Business Machines Corporation, 253 pages.

(Continued)

*Primary Examiner* — Allen T Cao
(74) *Attorney, Agent, or Firm* — John D. Henkhaus

(57) ABSTRACT

An approach to a reduced-head hard disk drive (HDD) involves a load/unload (LUL) ramp subsystem that includes a ramp assembly that includes a translatable lever member and a LUL ramp member coupled thereto, and interconnected elevator interfaces coupled with the ramp by way of a set of flexures. The ramp subsystem is configured such that in response to a sufficient force being applied to the lever by the HSA, a distal end of the ramp is positioned so that an outer perimeter of a recording disk of an HDD is free of a channel at the distal end of the ramp. The subsystem may further include a motor configured to drive rotation of a lead screw to which the ramp assembly is attached, to drive vertical translation of the ramp assembly, thereby providing for loading the vertically-translatable HSA onto and off of each of the disks of a multiple-disk stack.

23 Claims, 8 Drawing Sheets

(56) References Cited

U.S. PATENT DOCUMENTS

| | | | |
|---|---|---|---|
| 5,831,795 A | 11/1998 | Ma et al. | |
| 5,875,074 A | 2/1999 | Ho et al. | |
| 6,057,988 A | 5/2000 | Berberich et al. | |
| 6,212,045 B1 | 4/2001 | Guzik | |
| 6,452,753 B1* | 9/2002 | Hiller | G11B 5/54 360/254.7 |
| 6,473,268 B2 | 10/2002 | Simozato | |
| 6,473,270 B1* | 10/2002 | McDonald | G11B 5/54 360/265.1 |
| 6,480,361 B1 | 11/2002 | Patterson | |
| 6,693,773 B1 | 2/2004 | Sassine | |
| 7,548,399 B2* | 6/2009 | Shin | G11B 5/105 360/254.7 |
| 7,813,078 B1 | 10/2010 | Gleason et al. | |
| 7,986,491 B2 | 7/2011 | Albrecht et al. | |
| 8,035,913 B2 | 10/2011 | Kim et al. | |
| 8,112,580 B2 | 2/2012 | Bandic et al. | |
| 8,208,215 B2 | 6/2012 | Molaro et al. | |
| 8,824,094 B1 | 9/2014 | Furlong et al. | |
| 8,958,172 B1 | 2/2015 | Hansen | |
| 8,958,173 B1 | 2/2015 | Hirano et al. | |
| 9,025,277 B1 | 5/2015 | Hirano | |
| 9,183,862 B1 | 11/2015 | Shah et al. | |
| 9,218,833 B1 | 12/2015 | Shah et al. | |
| 9,552,835 B1 | 1/2017 | Tamayo et al. | |
| 9,704,521 B1 | 7/2017 | Shah et al. | |
| 10,269,380 B1 | 4/2019 | Sun et al. | |
| 2002/0067685 A1 | 7/2002 | Bae et al. | |
| 2005/0280945 A1* | 12/2005 | Duvall | G11B 5/5521 360/254.7 |
| 2005/0286153 A1 | 12/2005 | Brooks et al. | |
| 2005/0286171 A1* | 12/2005 | Kim | G11B 5/54 360/254.7 |
| 2006/0002028 A1 | 1/2006 | Nayar et al. | |
| 2006/0117558 A1* | 6/2006 | Koh | G11B 5/4806 29/737 |
| 2006/0171078 A1* | 8/2006 | Kajitani | G11B 5/54 360/254.7 |
| 2006/0256478 A1* | 11/2006 | Hayakawa | G11B 5/48 360/254.7 |
| 2007/0008653 A1 | 1/2007 | Ohno et al. | |
| 2009/0279199 A1 | 11/2009 | Zhang | |
| 2010/0091408 A1 | 4/2010 | Albrecht et al. | |
| 2012/0002328 A1 | 1/2012 | Aoki et al. | |
| 2019/0147909 A1 | 5/2019 | Sun et al. | |
| 2019/0333533 A1 | 10/2019 | Mendonsa et al. | |
| 2020/0027479 A1 | 1/2020 | Myers et al. | |

OTHER PUBLICATIONS

International Search Report and Written Opinion for counterpart PCT/US2019/042495, dated Apr. 17, 2020, 10 pages, KIPO ISA/KR.

\* cited by examiner

VERTICALLY TRANSLATING LOAD/UNLOAD RAMP MECHANISM FOR COLD STORAGE DATA STORAGE DEVICE

FIELD OF EMBODIMENTS

Embodiments of the invention may relate generally to a reduced-head hard disk drive having an actuator elevator mechanism and particularly to approaches to a vertically translating and rotating load/unload ramp mechanism.

BACKGROUND

There is an increasing need for archival storage. Tape is a traditional solution for data back-up, but is very slow to access data. Current archives are increasingly "active" archives, meaning some level of continuing random read data access is required. Traditional hard disk drives (HDDs) can be used but cost may be considered undesirably high. Other approaches considered may include HDDs with extra large diameter disks and HDDs having an extra tall form factor, with both requiring large capital investment due to unique components and assembly processes, low value proposition in the context of cost savings, and barriers to adoption in the marketplace due to uniquely large form factors, for example.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DESCRIPTION

Approaches to a multi-disk hard disk drive having an actuator elevator mechanism and a ramp elevator mechanism are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a multi-disk, reduced read-write head, digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
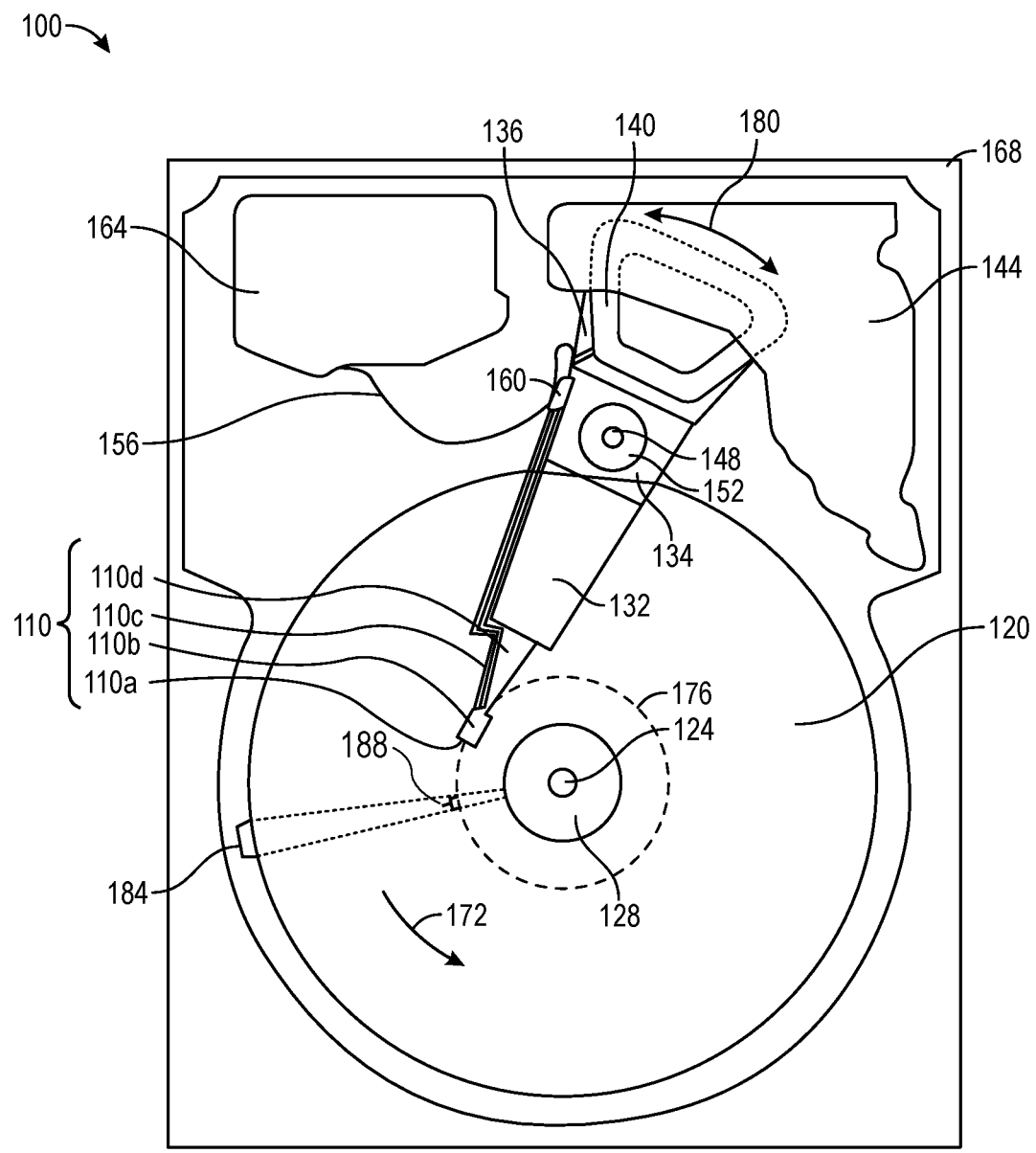
FIG. 1 is a plan view illustrating a hard disk drive, according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components.

Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable"). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Recall that there is an increasing need for cost effective "active" archival storage (also referred to as "cold storage"), preferably having a conventional form factor and utilizing many standard components. One approach involves a standard HDD form factor (e.g., a 3.5" form factor) and largely common HDD architecture, with n disks in one rotating disk stack, but containing fewer than 2n read-write heads, according to embodiments. Such a storage device may utilize an articulation mechanism that can move the heads to mate with the different disk surfaces (for a non-limiting example, only 2 heads but 5+ disks for an air drive or 8+ disks for a He drive), where the primary cost savings may come from eliminating the vast majority of the heads in the drive.

Ramp load/unload (LUL) technology involves a mechanism that moves the head stack assembly (HSA), including the read-write head sliders, away from and off the disks and safely positions them onto a cam-like structure. The cam typically includes a shallow ramp on the side closest to the disk. During a power-on sequence, for example, the read-write heads are loaded by moving the sliders off the ramp and over the disk surfaces when the disks reach the appropriate rotational speed. Thus, the terminology used is that the sliders or HSA are "loaded" to or over the disk (i.e., off the ramp) into an operational position, and "unloaded" from the disk (i.e., onto the ramp) such as in an idle position. In the context of a multi-disk HDD having an actuator elevator mechanism, in order to move the heads up and down to different disks the heads need to be backed off the ramp and then re-engaged to the ramp at the next disk location.

Actuator Subsystem for Reduced-Head Hard Disk Drive

Figure 2A:
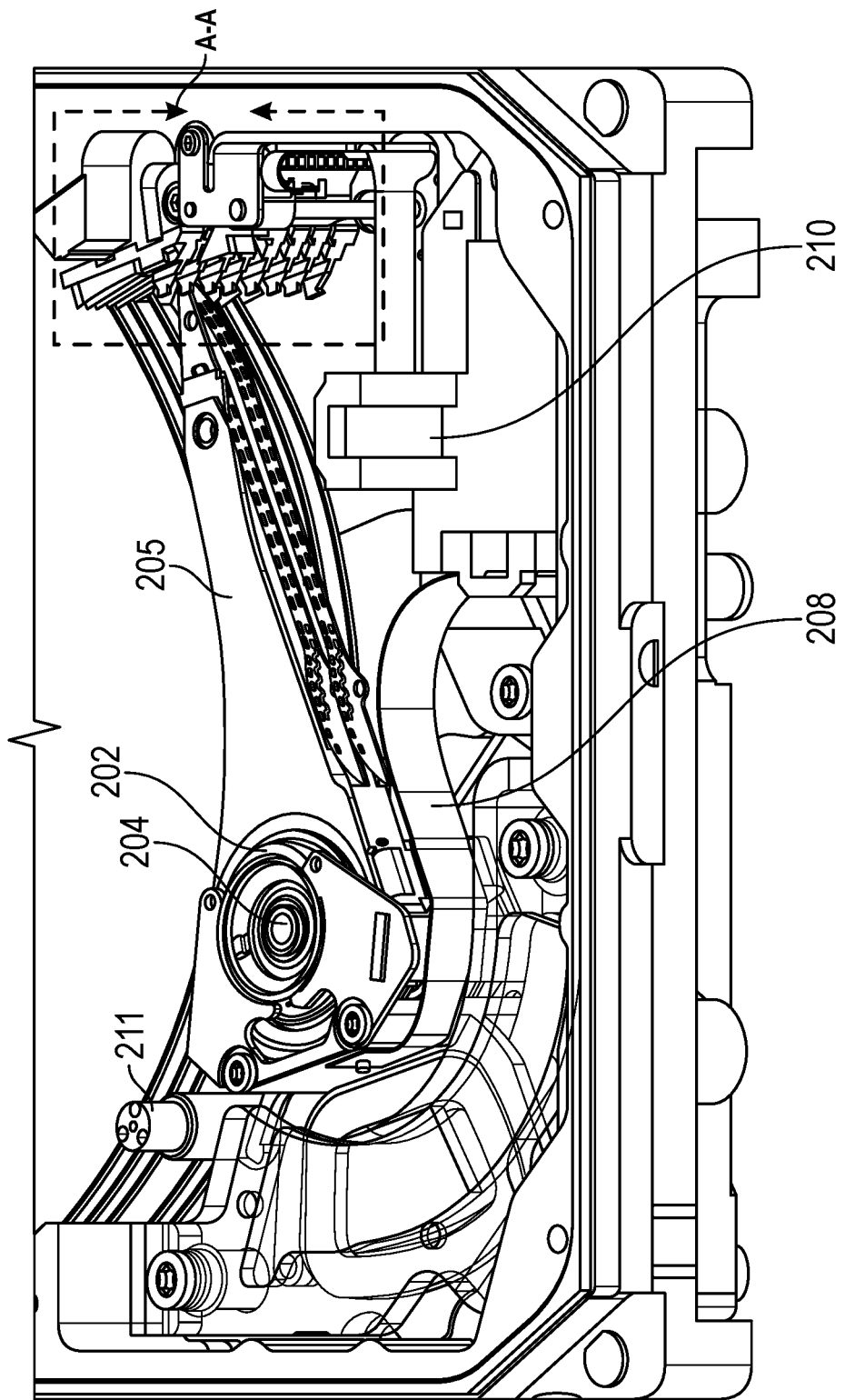
FIG. 2A is a perspective view illustrating an actuator subsystem in a reduced-head hard disk drive, according to an embodiment.
Figure 2B:
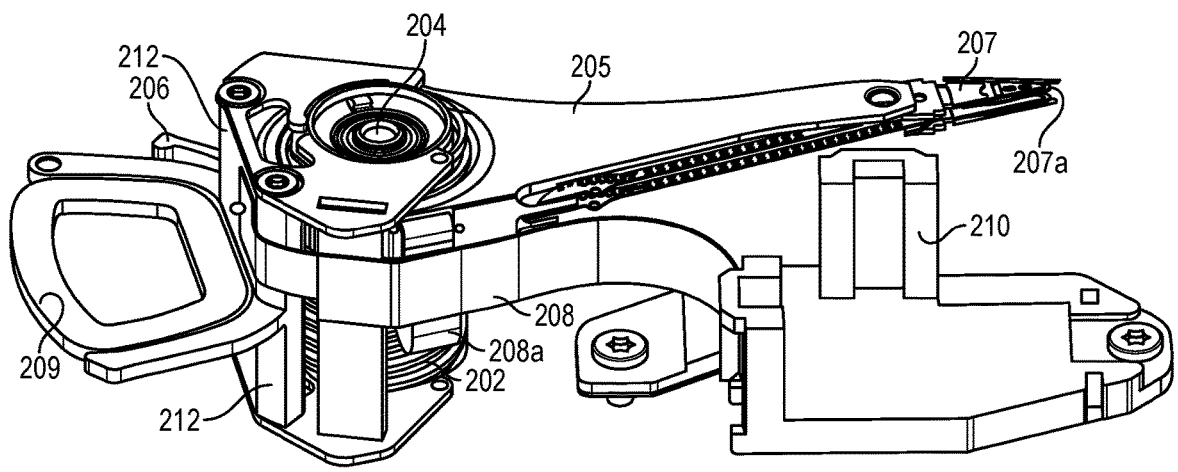
FIG. 2B is an isolated perspective view illustrating the actuator subsystem of FIG. 2A, according to an embodiment.
Figure 2C:
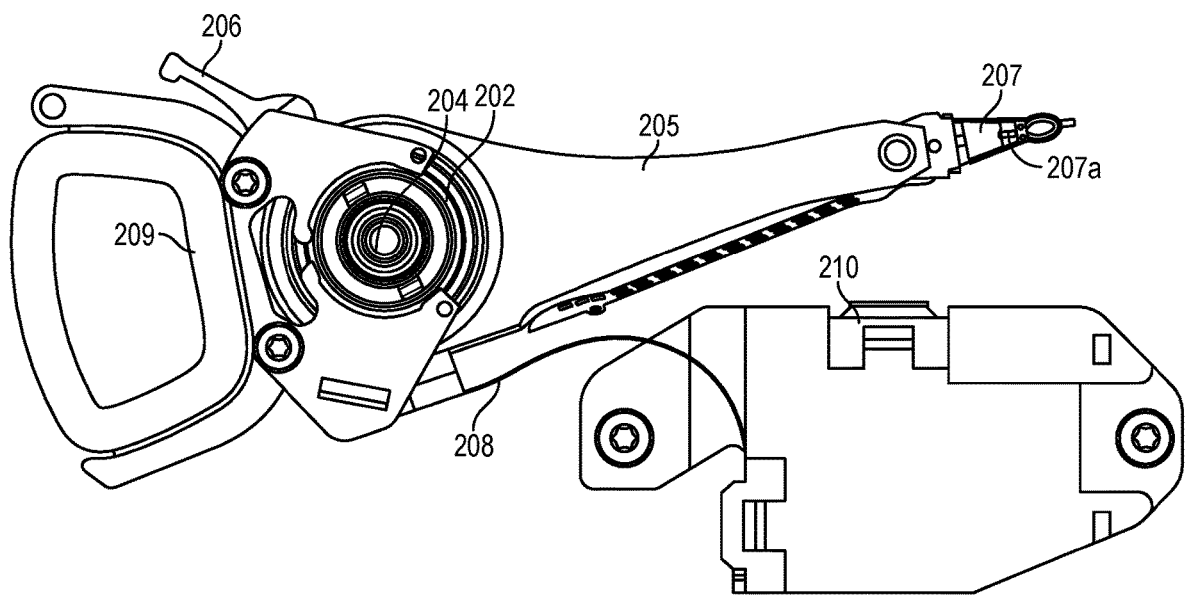
FIG. 2C is an isolated top view illustrating the actuator subsystem of FIG. 2A, according to an embodiment.

FIG. 2A is a perspective view illustrating an actuator subsystem in a reduced-head hard disk drive (HDD), FIG. 2B is an isolated perspective view illustrating the actuator subsystem of FIG. 2A, and FIG. 2C is an isolated plan view illustrating the actuator subsystem of FIG. 2A, all according to embodiments. FIGS. 2A-2C collectively illustrate an actuator subsystem comprising a low profile ball screw cam assembly 202 (or "cam 202"), which transforms rotary motion into linear motion, with a stepper motor 204 (or "stepping motor") disposed therein to form an actuator elevator subassembly, which is disposed within the actuator pivot and pivot bearing of the actuator subsystem (e.g., the "pivot cartridge") and is configured to vertically translate at least one actuator arm 205 (see, e.g., arm 132 of FIG. 1) along with a respective HGA 207 (see, e.g., HGA 110 of FIG. 1). According to an embodiment, the actuator subsystem for a reduced-head HDD consists of two actuator arm 205 assemblies each with a corresponding HGA 207 (e.g., a modified HSA, in which the actuator arm assemblies translate vertically, or elevate, while the VCM coil 209 may be fixed in the vertical direction) housing a corresponding read-write head 207a (see, e.g., read-write head 110a of FIG. 1). Generally, the term "reduced-head HDD" is used to refer to an HDD in which the number of read-write heads is less than the number of magnetic-recording disk media surfaces.

With respect to electrical signal transmission, FIGS. 2A-2C further illustrate a flexible cable assembly 208 ("FCA 208"), which is configured to comprise a dynamic vertical "loop" 208a ("FCA vertical loop 208a") for vertical translation of the end(s) that are coupled to the actuator elevator subassembly and/or another portion of the actuator subsystem. This FCA vertical loop 208a is in addition to a typical dynamic horizontal loop for horizontal translation purposes for when the actuator to which one end is connected is rotating. The actuator subsystem further comprises at least one connector housing 210 for housing an electrical connector for transferring electrical signals (e.g., motor power, sensor signals, etc.) between the actuator elevator subassembly and a ramp elevator assembly (described in more detail elsewhere herein).

With respect to actuator arm locking, FIGS. 2A-2C further illustrate an arm lock subsystem 206, coupled with or constituent to a coil support assembly 212, configured to mechanically interact with an outer diameter crash stop 211 ("ODCS 211") to lock and unlock the actuator elevator subassembly, as described in more detail elsewhere herein.

Elevator Load/Unload Ramp Assembly for Reduced-Head Hard Disk Drive

Figure 3A:
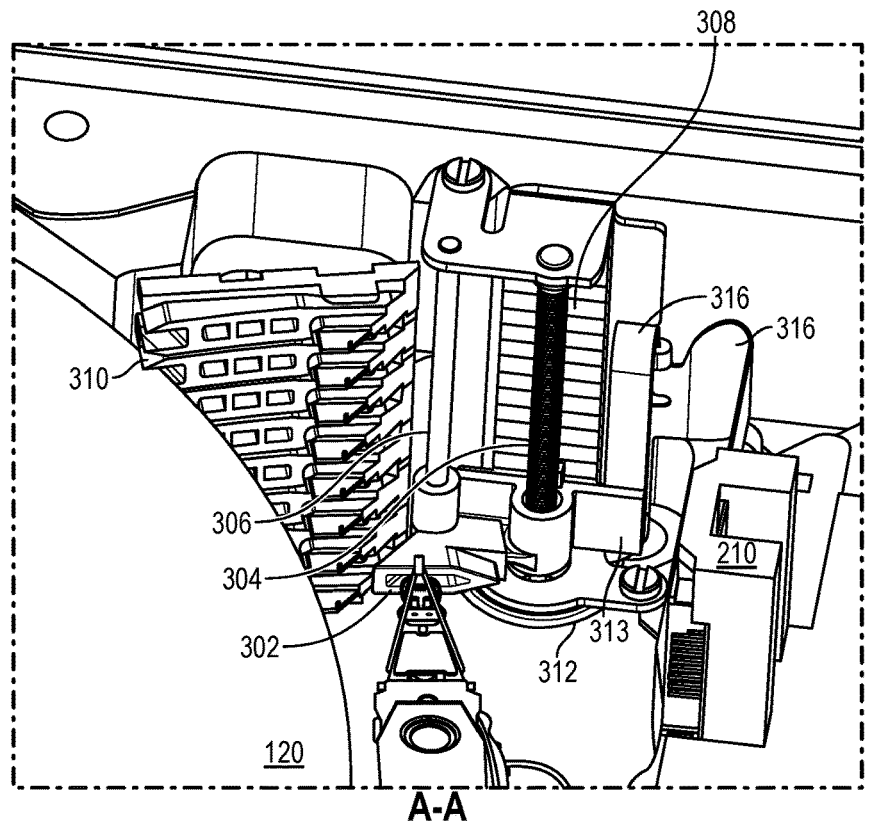
FIG. 3A is a perspective view illustrating an elevator ramp assembly, according to an embodiment.
Figure 3B:
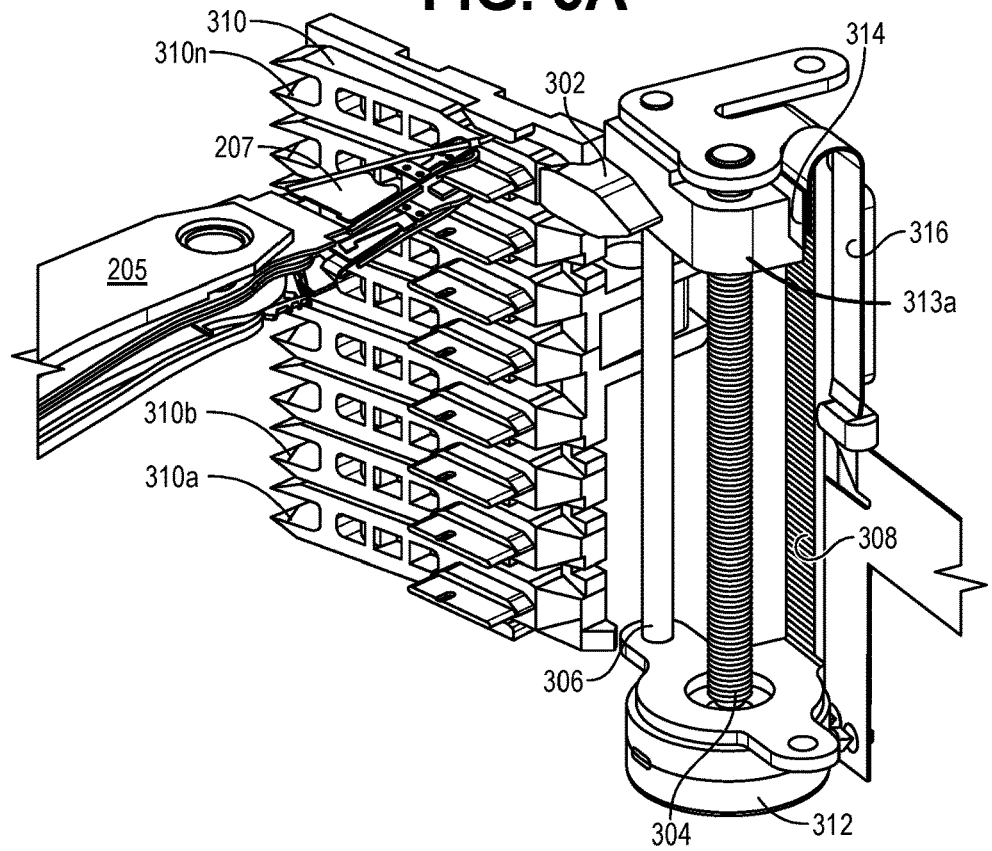
FIG. 3B is a perspective view illustrating an elevator ramp assembly, according to an embodiment.

One approach to a LUL ramp in the context of a reduced-head HDD may be to employ a traditional static ramp. FIG. 3A is a perspective view illustrating an elevator ramp assembly, and FIG. 3B is a perspective view illustrating a similar elevator ramp assembly (having a slight variation in the motor carriage configuration), according to embodiments. The elevator ramp assembly or ramp mechanism illustrated is positioned generally in the area of A-A (FIG. 2A) and comprises a multi-disk ramp 310 and a single ramp adapter 302 coupled to a stepper motor carriage 313 of a stepper motor 312. Thus, the stepper motor 312 drives the vertical translation of the ramp adapter 302 so that the ramp adapter 302 can be moved, synchronously or asynchronously, in conjunction with an actuator elevator subassembly of an actuator subsystem (see, e.g., FIGS. 2A-2C), such that the ramp adapter 302 can mate with a desired "level" of the ramp 310. Each level of the ramp 310 corresponds to a respective disk-ramp portion 310n of the ramp 310 (where n is a number that may vary from implementation to implementation based on the number of disks in a given HDD), which corresponds to the position of a respective disk 120 when installed in an HDD. When the ramp adapter 302 reaches the desired level of the ramp 310, then the head-stack assembly (HSA) can be driven by the VCM (see, e.g., the VCM of FIG. 1) to engage with the ramp adapter 302 and then with the appropriate level of the ramp 310, such that the HSA can ultimately be loaded to an operational position relative to the desired disk of the multi-disk stack.

The drive mechanism for the ramp adapter 302 comprises the stepper motor 312 with carriage 313 (FIG. 3A), 313a (FIG. 3B), a lead screw 304 with which the carriage 313 is translatably coupled, and a support or guide rail 306. As the ramp adapter 302 is fixedly coupled with the stepper motor carriage 313, 313a, the ramp adapter 302 is driven by the rotation of the lead screw 304 under the control of the stepper motor 312.

A proximity sensing subassembly, for ramp adapter 302 position sensing and driver feedback purposes, is configured to sense the Z-position (e.g., vertical height) of the carriage 313, 313a and thus the ramp adapter 302. The type/form of sensing mechanism used may vary from implementation to implementation. For example, according to an embodiment, sensing is based on the position of the carriage 313, 313a and the ramp adapter 302 relative to a magnetic encoding strip and, ultimately, relative to the disk stack. The proximity sensing subassembly comprises a magnetic encoder strip 308 located proximally to at least one corresponding position sensor 314 mounted on the carriage 313, 313a. According to an embodiment, one or more Hall effect sensors are implemented for the position sensor(s) 314, which function in coordination with the closely-positioned magnetic encoder strip 308 mounted on a support structure or stiffener. Generally, a Hall effect sensor (or simply "Hall sensor") measures the magnitude of a magnetic field, where the output voltage of the sensor is proportional to the magnetic field strength through the sensor. In other embodiments, other magnetic or non-magnetic based sensing mechanisms may be used for position detection (see, e.g., the inductive sensing mechanism of FIGS. 5A, 5B). A flexible cable assembly (FCA) 316 comprising a vertical "loop" or slack, may be implemented to carry the electrical signals from the position sensor(s) 314 to an electrical connector on connector housing 210 and onward to some form of controller electronics.

Rotatable Load/Unload Ramp Assembly

A fixed load/unload (LUL) ramp, such as ramp 310 (FIGS. 3A-3B), interfaces with each disk of a multi-disk stack simultaneously, which would therefore require more material (e.g., plastic) to form the multi-level ramp. Thus, it is not considered cost-efficient to have such a multi-level ramp if only one disk needs to be accessed at a time, and a multi-level ramp inhibits the ability to introduce tighter disk spacing within the disk stack.

Figure 4A:
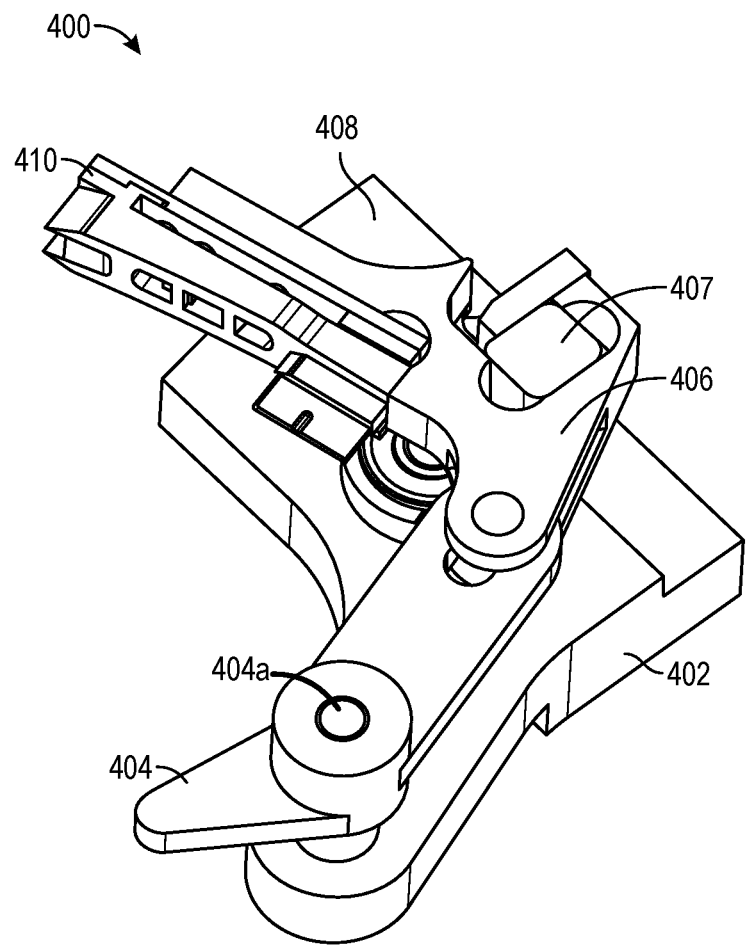
FIG. 4A is a perspective view illustrating a rotatable ramp assembly, according to an embodiment.

FIG. 4A is a perspective view illustrating a rotatable ramp assembly, according to an embodiment. Rotatable ramp assembly 400 or ramp mechanism comprises a base 402, on which a rotating latch link 404 is coupled. Rotating latch link 404 is configured for rotation (counter-clockwise) about axis 404a by physical interaction with a part of the head stack assembly (HSA), such as by interaction with actuator arm 205 (see, e.g., FIGS. 2A-2C). The latch link 404 is mechanically coupled with a rotating ramp holder 406, to which a LUL ramp 410 is coupled. Note that the ramp holder 406 and ramp 410 may be integrated together and formed as a unitary structure, i.e., a single part. As the latch link 404 is driven to rotate counter-clockwise, ramp holder 406 and ramp 410 are driven to overcome magnetic attraction between a magnet 407 fixed to the ramp holder 410 and a latch stop 408, and to rotate clockwise up to a point of contact with the latch stop 408, thereby moving the ramp 410 in and out of engagement with a disk of a multi-disk stack.

Figure 4B:
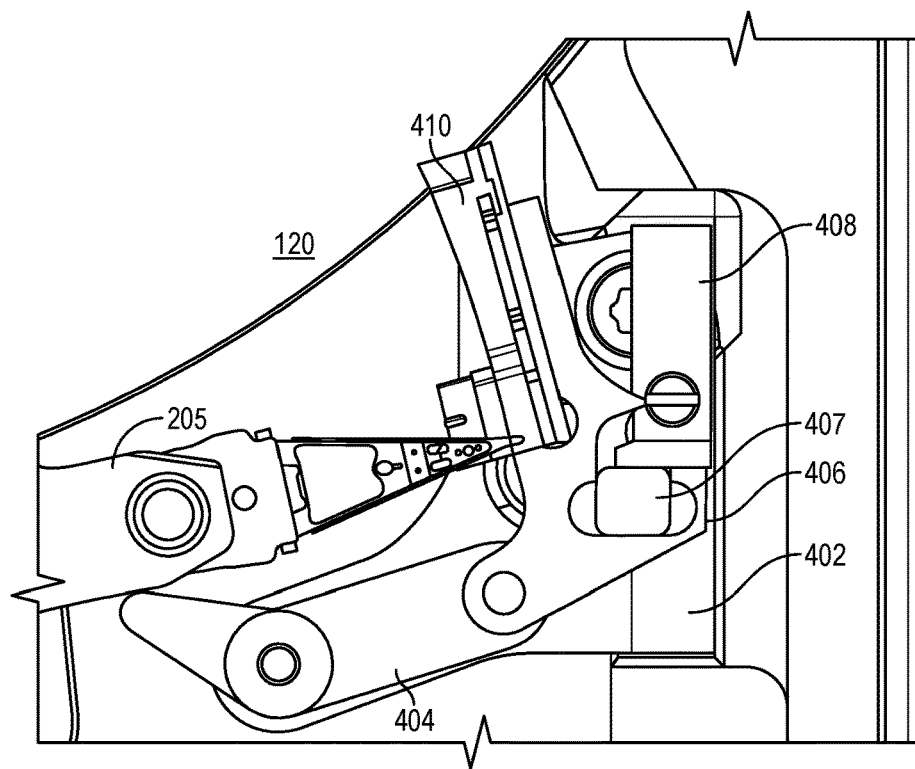
FIG. 4B is a top view illustrating the rotatable ramp assembly of FIG. 4A in a first operational state within a hard disk drive, according to an embodiment.
Figure 4C:
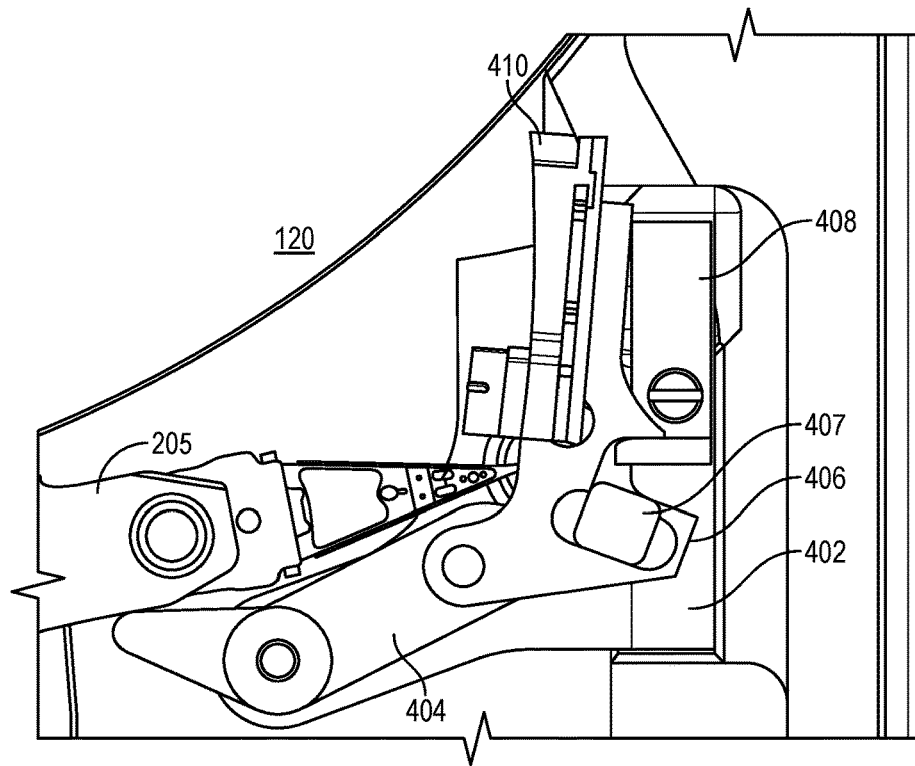
FIG. 4C is a top view illustrating the rotatable ramp assembly of FIG. 4A in a second operational state within a hard disk drive, according to an embodiment.

FIG. 4B is a top view illustrating the rotatable ramp assembly of FIG. 4A in a first operational state within a hard disk drive, and FIG. 4C is a top view illustrating the rotatable ramp assembly of FIG. 4A in a second operational state within a hard disk drive, both according to an embodiment. The operational state depicted in FIG. 4B shows the LUL ramp assembly 400, positioned generally in the area of A-A (FIG. 2A), engaged with a disk (see, e.g., recording medium 120 of FIG. 1) of a multi-disk stack, whereby a distal end of the ramp 410 is positioned so that the outer perimeter of the disk 120 is disposed within a channel at the distal end of the ramp 410, and with the HSA shown parked on the ramp 410. As such, the ramp holder 406 is latched or temporarily fixed by the magnetic attraction between the magnet 407 and the latch stop 408. This first operational state of the rotatable ramp assembly 400 allows the HSA to be loaded onto a disk for various seek/read/write operations to be performed by the HSA under the control of the VCM. The operational state depicted in FIG. 4C shows the LUL ramp assembly 400 disengaged from a disk 120 of a multi-disk stack, whereby the distal end of the ramp 410 is positioned so that the outer perimeter of the disk 120 is free of (i.e., not disposed within) the channel at the distal end of the ramp 410, and with the HSA shown removed from the ramp 410, in response to a sufficient force applied by the actuator arm 205 to the latch link 404. As such, the ramp holder 406 is unlatched from the magnetic attraction of the latch stop 408 with the magnet 407, and in a rotated position with the ramp 410 tip off the disk surface. This second operational state of the rotatable ramp assembly 400 allows for disk seek operations (i.e., disk-to-disk translation operations) of the HSA under the control of the actuator elevator subassembly comprising the cam 202 and in-pivot stepper motor 204 (FIGS. 2A-2C), according to an embodiment. Likewise, the second operational state of the rotatable ramp assembly 400 allows for vertical translation of the ramp assembly 400, such as described in more detail in reference to FIG. 4D. In response to removal of the force applied by the actuator arm 205 to the latch link 404, the ramp holder 406 latches again by way of the magnetic attraction between the magnet 407 and the latch stop 408, that is, the magnetic attraction between the magnet 407 and the latch stop 408 is sufficiently strong to pull the ramp 410 back into the disk 120 area when the actuator arm 205 recedes from contact with the latch link 404.

Figure 4D:
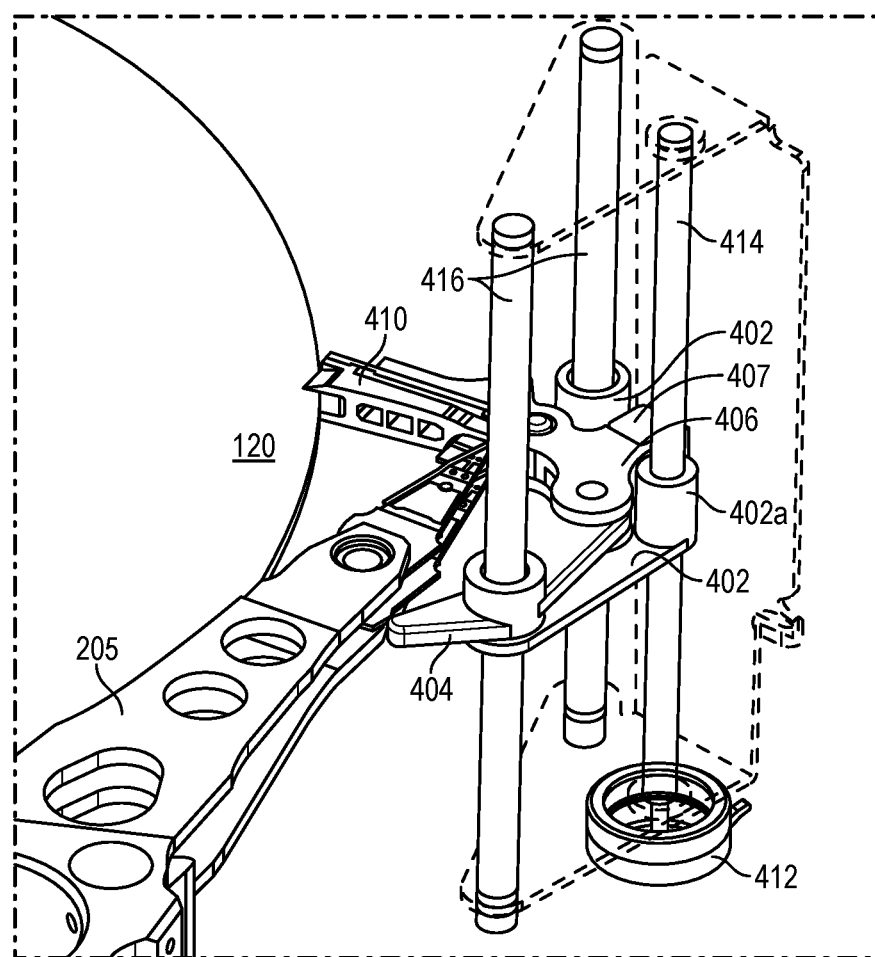
FIG. 4D is a perspective view illustrating a vertically translatable rotatable ramp assembly within a hard disk drive, according to an embodiment.

FIG. 4D is a perspective view illustrating a vertically translatable rotatable ramp assembly within a hard disk drive, according to an embodiment. The translatable ramp assembly illustrated comprises a ramp assembly (similar to rotatable ramp assembly 400, with like-numbered parts configured and operable the same as or similarly to how described in reference to FIG. 4A) or ramp mechanism, positioned generally in the area of A-A (FIG. 2A), including a plurality of structural interfaces 402a for coupling with a lead screw 414, configured to be driven by a stepper motor 412, and at least one guide rail 416. The stepper motor 412 drives the vertical translation of the ramp assembly 400 so that the ramp 410 can be moved, when in the second operational state illustrated in FIG. 4C, in conjunction with an actuator elevator subassembly of an actuator subsystem (see, e.g., FIGS. 2A-2C), such that the ramp 410 can mate with a desired disk 120 of a multi-disk stack. When the ramp 410 reaches the desired level of the disk stack, then the head-stack assembly (HSA) can be driven by the VCM (see, e.g., the VCM of FIG. 1) to engage with the ramp 410 such that the HSA can ultimately be loaded to an operational position relative to the desired disk of the multi-disk stack, such as with the first operational state illustrated FIG. 4B. According to an embodiment, at least one of the interfaces 402a, such as an interface 402a associated with the base 402 and/or the latch link 404, comprises a bushing. According to another embodiment, at least one of the interfaces 402a, such as an interface 402a associated with the base 402 and/or the latch link 404, comprises a linear bearing.

A similar proximity sensing subassembly such as illustrated and described in reference to FIGS. 3A-3B (not shown here, for drawing simplicity and clarity) may be implemented for ramp 410 and/or ramp assembly 400 position sensing and driver feedback purposes, and configured to sense the Z-position (e.g., vertical height) of the ramp 410 relative to a magnetic encoder strip and, ultimately, relative to the disk stack. That is, according to an embodiment a proximity sensing subassembly may comprise a magnetic encoder strip (e.g., magnetic encoder strip 308 of FIGS. 3A-3B) located proximally to at least one corresponding position sensor (e.g., position sensor(s) 314 of FIGS. 3A-3B) mounted on the ramp assembly 400.

Articulated Load/Unload Ramp Assembly

Figure 5A:
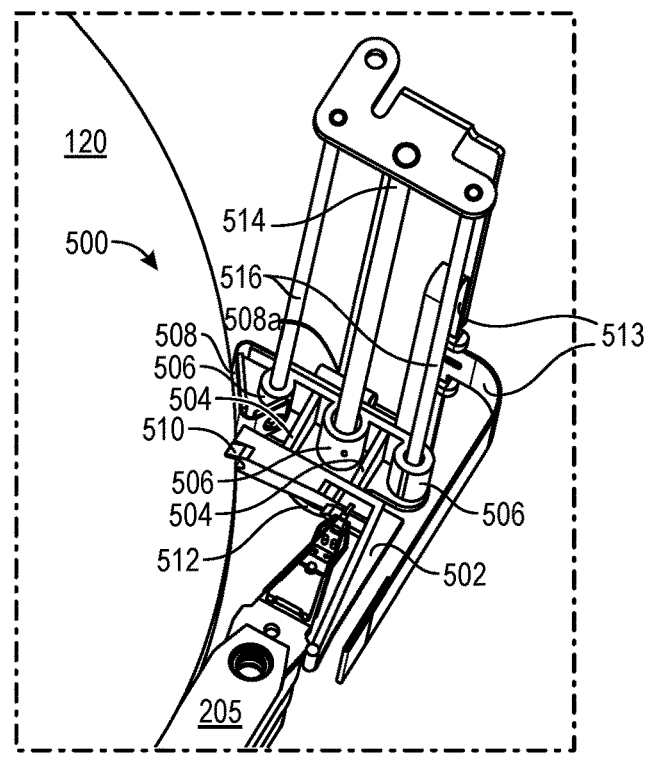
FIG. 5A is a perspective view illustrating a vertically translatable articulated ramp assembly in a first operational state, according to an embodiment.
Figure 5B:
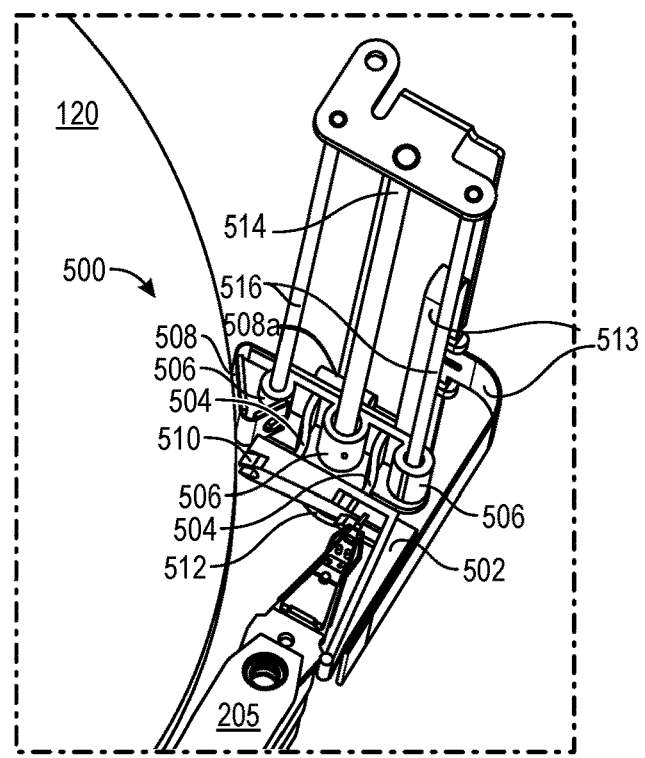
FIG. 5B is a perspective view illustrating articulated ramp assembly of FIG. 5A in a second operational state, according to an embodiment.

FIG. 5A is a perspective view illustrating a vertically translatable articulated ramp assembly in a first operational state, and FIG. 5B is a perspective view illustrating the articulated ramp assembly of FIG. 5A in a second operational state, both according to an embodiment. The articulated ramp assembly 500 or ramp mechanism, positioned generally in the area of A-A (FIG. 2A), comprises a lever portion 502 or member and a ramp portion 510 or member coupled together in a substantially normal relative positioning (although normal relative positioning is not required). The lever portion 502 and the ramp portion 510 are coupled with a plurality of interconnected structural elevator interfaces 506 via a plurality of flexures 504, which act like cantilevered spring beams. At least one of the elevator interfaces 506 is movably coupled with a lead screw 514, which is configured for driving by a stepper motor 512, while the other elevator interface(s) is movably coupled with a respective guide rail 516. The lever portion 502 is configured for translation by physical interaction with a part of the head stack assembly (HSA), such as by interaction with actuator arm 205 (see, e.g., FIGS. 2A-2C).

FIG. 5A illustrates the articulated ramp assembly 500 in a first operational state within a hard disk drive, and FIG. 5B illustrates the articulated ramp assembly in a second operational state within a hard disk drive. The operational state depicted in FIG. 5A shows the articulated assembly 500 engaged with a disk (see, e.g., recording medium 120 of FIG. 1) of a multi-disk stack, whereby a distal end of the ramp portion 510 is positioned so that the outer perimeter of the disk 120 is disposed within a channel at the distal end of the ramp portion 510, and with the HSA shown parked on the ramp 510. This first operational state of the articulated ramp assembly 500 allows the HSA to be loaded onto a disk for various seek/read/write operations to be performed by the HSA under the control of the VCM.

The operational state depicted in FIG. 5B shows the articulated ramp assembly 500 disengaged from a disk 120 of a multi-disk stack, whereby the distal end of the ramp 510 is positioned so that the outer perimeter of the disk 120 is free of (i.e., not disposed within) the channel at the distal end of the ramp 510. As the lever portion 502 is driven to translate rightward, the flexures 504 are flexed (e.g., in a state of spring tension) and the interconnected ramp portion 504 is likewise driven rightward, thereby moving the ramp portion 510 out of engagement with a disk of a multi-disk stack. As such, the ramp portion 510 is in a translated position with the ramp tip off the disk surface. This second operational state of the articulated ramp assembly 500 allows for disk seek operations (i.e., disk-to-disk translation operations) of the HSA under the control of the actuator elevator subassembly comprising the cam 202 and in-pivot stepper motor 204 (FIGS. 2A-2C), according to an embodiment. Likewise, the second operational state of the articulated ramp assembly 500 allows for vertical translation of the ramp assembly 500, such as described in more detail elsewhere herein.

Note that the illustrations of FIGS. 5A-5B depict the flexures 504 in a relaxed or neutral position when the ramp portion 510 is engaged with the disk 120, and in a flexed position (e.g., in a state of spring tension) when the ramp portion 510 is disengaged from the disk 120. However, this arrangement may vary from implementation to implementation, as the articulated ramp assembly 500 may be configured so that the flexures 504 are in a relaxed or neutral position when the ramp portion 510 is disengaged from the disk 120 and in a flexed position when the ramp portion 510 is engaged with the disk 120.

Similarly to the rotatable ramp assembly 400 (see, e.g., FIG. 4A), the articulated ramp assembly 500 is considered a vertically translatable articulated ramp assembly within a hard disk drive, according to an embodiment, in view of the plurality of structural elevator interfaces 506 configured for coupling with a lead screw 514, configured to be driven by a stepper motor 512, and at least one guide rail 516. The stepper motor 512 drives the vertical translation of the ramp assembly 500 so that the ramp portion 510 can be moved, when in the second operational state illustrated in FIG. 5B, in conjunction with an actuator elevator subassembly of an actuator subsystem (see, e.g., FIGS. 2A-2C), such that the ramp portion 510 can mate with a desired disk 120 of a multi-disk stack. When the ramp portion 510 reaches the desired level of the disk stack, then the head-stack assembly (HSA) can be driven by the VCM (see, e.g., the VCM of FIG. 1) to engage with the ramp portion 510 such that the HSA can ultimately be loaded to an operational position relative to the desired disk of the multi-disk stack, such as with the first operational state illustrated FIG. 5A. As with the rotatable ramp assembly 400, at least one of the elevator interfaces 506 may comprise a bushing and/or at least one of the elevator interfaces 506 may comprise a linear bearing.

While a similar proximity sensing subassembly such as illustrated and described in reference to FIGS. 3A-3B may be implemented for ramp assembly 500 position sensing and driver feedback purposes, and configured to sense the Z-position (e.g., vertical height) of the ramp portion 510 relative to a magnetic encoder strip, according to an embodiment a sensor 508 is coupled with a portion of the ramp assembly 500 and positioned as illustrated in FIGS. 5A-5B in order to directly sense the location of the disk edge, rather than sensing the position based on an object remote from the disk stack (e.g., a magnetic encoder strip). According to an embodiment, a non-contact inductive proximity sensor, and associated electronic circuitry 508a, is utilized for sensor 508 and is positioned as close to the disk stack as practically feasible. As such, inductive sensor 508 relies on the principle of electromagnetic induction and is implemented in the form of one or more coils embedded in a flexible printed circuit (FPC) and/or flexible cable assembly such as a portion of or an electrical extension of FCA 513, which may ultimately tie in with FCA 208 (FIGS. 2A-2C). In one form of inductive sensor 508, a coil (e.g., an inductor, such as in an LCR circuit comprising an inductor, capacitor, and resistor) may be used to generate a varying magnetic field and another coil may be used to detect changes in the magnetic field introduced by a metallic object, such as the nickel-plating covering the edge of disk 120. In another form of inductive sensor 508, a metallic object (such as the nickel-plating covering the edge of disk 120) moving past the coil(s) will alter the inductance in the coil and hence the resonant frequency of the LCR circuit electrically coupled to the electronic circuitry 508a, whereby the change in resonant frequency is detected. The electronic circuitry 508a then converts this change in resonant frequency to a standard DAC (digital-to-analog converter) output, which can be used for servo control of the stepper motor 512. Hence, the change in resonant frequency of the inductive sensor 508, when moving from media to air gap to media, can be detected and, therefore, the positioning of the ramp assembly 500 relative to the disk stack can likewise be determined. The type/form of sensing mechanism used may vary from implementation to implementation.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A vertically-translatable load/unload (LUL) ramp system for a reduced-head hard disk drive (HDD), the system comprising:
    a ramp assembly comprising:
        a translatable LUL ramp member;
        a translatable lever member coupled with the LUL ramp member and configured for mechanical interaction with a head-stack assembly (HSA);
        a plurality of interconnected structural elevator interfaces coupled with the LUL ramp member; and
        a plurality of spring beam flexure structures fixed at both ends to interconnect the elevator interfaces with the LUL ramp member to move the LUL ramp member in response to removal of a force being applied to the lever member by the HSA.

2. The LUL ramp system of claim 1, wherein a first operational state of the ramp assembly is characterized by:
    a zero or negligible force being applied to the lever member by the HSA; and
    a distal end of the LUL ramp member positioned such that an outer perimeter of a recording disk of an HDD is disposed within a channel at the distal end of the LUL ramp member.

3. The LUL ramp system of claim 2, wherein the first operational state of the ramp assembly is further characterized by:
    the plurality of flexures in a relaxed state.

4. The LUL ramp system of claim 2, wherein the first operational state of the ramp assembly is further characterized by:
    the plurality of flexures in a flexed state.

5. The LUL ramp system of claim 1, wherein a second operational state of the ramp assembly is characterized by:
    a sufficient force being applied to the lever member by the HSA such that a distal end of the LUL ramp member is positioned such that an outer perimeter of a recording disk of an HDD is free of a channel at the distal end of the LUL ramp member.

6. The LUL ramp system of claim 5, wherein the second operational state of the ramp assembly is further characterized by:
    the plurality of flexures in a relaxed state.

7. The LUL ramp system of claim 5, wherein the second operational state of the ramp assembly is further characterized by:
    the plurality of flexures in a flexed state.

8. The LUL ramp system of claim 1, further comprising:
    a stepper motor configured to drive rotation of a lead screw to drive translation of the ramp assembly along an axis of the lead screw.

9. The LUL ramp system of claim 1, further comprising:
    one or more guide rails configured to interface with a respective corresponding elevator interface of the plurality of structural elevator interfaces of the ramp assembly; and
    a stepper motor configured to drive rotation of a lead screw to drive translation of the ramp assembly along an axis of the lead screw and with support from the one or more guide rails.

10. The LUL ramp system of claim 9, wherein:
    a first elevator interface of the plurality of structural elevator interfaces is positioned around a first guide rail of the one or more guide rails;
    a second internally threaded elevator interface of the plurality of structural elevator interfaces is positioned around the lead screw; and
    a third elevator interface of the plurality of structural elevator interfaces is positioned around a second guide rail of the one or more guide rails.

11. The LUL ramp system of claim 10, wherein:
    a first flexure of the plurality of flexures is positioned between the first elevator interface and the second elevator interface; and
    a second flexure of the plurality of flexures is positioned between the second elevator interface and the third elevator interface.

12. The LUL ramp system of claim 1, wherein the ramp assembly further comprises:
    a proximity sensor positioned proximal to a distal end of the LUL ramp member and configured for detecting a vertical position of the ramp assembly corresponding to each recording disk of a multiple-disk stack of an HDD.

13. A hard disk drive comprising the LUL ramp system of claim 1.

14. A reduced-head hard disk drive (HDD) comprising:
    a plurality of n recording disk media rotatably mounted on a spindle;
    a plurality of fewer than 2n head sliders each comprising a read-write transducer configured to read from and to write to at least two disk media of the plurality of disk media;
    an actuator assembly configured to move the plurality of head sliders to access portions of the at least two disk media;
    an actuator elevator subassembly configured to move the actuator assembly to access the at least two disk media; and
    a ramp assembly comprising:
        a translatable LUL ramp portion,
        a translatable lever portion coupled with the LUL ramp portion and configured for mechanical interaction with a head-stack assembly (HSA) housing the plurality of head sliders,
        a plurality of interconnected structural elevator interfaces coupled with the ramp portion, and
        a plurality of spring beam flexures fixed at both ends to interconnect the elevator interfaces with the ramp portion to move the LUL ramp portion in response to removal of a force being applied to the lever portion by the HSA.

15. The reduced-head HDD of claim 14, further comprising:
    one or more guide rails configured to interface with a respective corresponding elevator interface of the plurality of structural elevator interfaces of the ramp assembly; and a stepper motor configured to drive rotation of a lead screw to drive translation of the ramp assembly along an axis of the lead screw and with support from the one or more guide rails.

16. The reduced-head HDD of claim 14, wherein a first operational state of the ramp assembly is characterized by:
   a zero or negligible force being applied to the lever portion by the HSA; and
   a distal end of the LUL ramp portion positioned such that an outer perimeter of a disk media of the plurality of disk media is disposed within a channel at the distal end of the LUL ramp portion.

17. The reduced-head HDD of claim 14, further comprising:
   one or more guide rails configured to interface with a respective corresponding elevator interface of the plurality of structural elevator interfaces of the ramp assembly; and
   a stepper motor configured to drive rotation of a lead screw to drive translation of the ramp assembly along an axis of the lead screw and with support from the one or more guide rails;
   wherein a second operational state of the ramp assembly is characterized by a sufficient force being applied to the lever portion by the HSA such that a distal end of the LUL ramp portion is positioned such that an outer perimeter of a disk of the plurality of disk media is free of a channel at the distal end of the LUL ramp portion and the ramp assembly is positioned for translation by the stepper motor.

18. A load/unload (LUL) ramp system for a reduced-head hard disk drive (HDD), the system comprising:
   a multiple-disk LUL ramp comprising a respective disk-ramp portion corresponding to a position corresponding to each of multiple recording disks;
   a stepper motor configured to drive rotation of a lead screw to which a carriage is translatably coupled; and
   a ramp adapter coupled with the carriage and positioned adjacent to the LUL ramp;
   wherein the carriage with ramp adapter translate vertically along an axis of the lead screw and in response to rotation of the lead screw, to position the ramp adapter adjacent to a particular disk-ramp portion of the multiple-disk LUL ramp.

19. The LUL ramp system of claim 18, further comprising:
   a proximity sensor configured for detecting a vertical position of the carriage with ramp adaptor.

20. A hard disk drive comprising the LUL ramp system of claim 18.

21. A translatable load/unload (LUL) ramp system for a hard disk drive (HDD), the system comprising:
   a ramp assembly comprising:
      a translatable LUL ramp member,
      a translatable lever member coupled with the LUL ramp member and configured for mechanical interaction with a head-stack assembly (HSA),
      a plurality of interconnected structural elevator interfaces coupled with the LUL ramp member, and
      a plurality of flexures interconnecting the elevator interfaces with the LUL ramp member; and
   a stepper motor configured to drive rotation of a lead screw to drive translation of the ramp assembly along an axis of the lead screw.

22. A translatable load/unload (LUL) ramp system for a hard disk drive (HDD), the system comprising:
   a ramp assembly comprising:
      a translatable LUL ramp member,
      a translatable lever member coupled with the LUL ramp member and configured for mechanical interaction with a head-stack assembly (HSA),
      a plurality of interconnected structural elevator interfaces coupled with the LUL ramp member, and
      a plurality of flexures interconnecting the elevator interfaces with the LUL ramp member;
   one or more guide rails configured to interface with a respective corresponding elevator interface of the plurality of structural elevator interfaces of the ramp assembly; and
   a stepper motor configured to drive rotation of a lead screw to drive translation of the ramp assembly along an axis of the lead screw and with support from the one or more guide rails.

23. A translatable load/unload (LUL) ramp system for a hard disk drive (HDD), the system comprising:
   a ramp assembly comprising:
      a translatable LUL ramp member;
      a translatable lever member coupled with the LUL ramp member and configured for mechanical interaction with a head-stack assembly (HSA);
      a plurality of interconnected structural elevator interfaces coupled with the LUL ramp member;
      a plurality of flexures interconnecting the elevator interfaces with the LUL ramp member; and
      a proximity sensor positioned proximal to a distal end of the LUL ramp member and configured for detecting a vertical position of the ramp assembly corresponding to each recording disk of a multiple-disk stack of an HDD.

* * * * *